United States Patent
Lu et al.

(10) Patent No.: US 9,462,572 B2
(45) Date of Patent: Oct. 4, 2016

(54) MULTIMEDIA BROADCAST MULTICAST SERVICE COUNTING METHOD AND SYSTEM

(75) Inventors: Chen Lu, Shenzhen (CN); Bin Wang, Shenzhen (CN); Zijiang Ma, Shenzhen (CN); Jianxun Ai, Shenzhen (CN)

(73) Assignee: ZTE CORPORATION, Shenzhen, Guangdong Province (CN)

( * ) Notice: Subject to any disclaimer, the term of this patent is extended or adjusted under 35 U.S.C. 154(b) by 130 days.

(21) Appl. No.: 13/876,444

(22) PCT Filed: Aug. 30, 2011

(86) PCT No.: PCT/CN2011/079106
§ 371 (c)(1),
(2), (4) Date: Mar. 27, 2013

(87) PCT Pub. No.: WO2012/041146
PCT Pub. Date: Apr. 5, 2012

(65) Prior Publication Data
US 2013/0215817 A1    Aug. 22, 2013

(30) Foreign Application Priority Data
Sep. 28, 2010 (CN) .......................... 2010 1 0297962

(51) Int. Cl.
*H04W 72/00* (2009.01)
*H04L 12/18* (2006.01)
(Continued)

(52) U.S. Cl.
CPC ........ *H04W 72/005* (2013.01); *H04L 12/1868* (2013.01); *H04L 41/12* (2013.01);
(Continued)

(58) Field of Classification Search
USPC ........................................................ 370/312
See application file for complete search history.

(56) References Cited

U.S. PATENT DOCUMENTS

| | | | |
|---|---|---|---|
| 8,891,426 B2 * | 11/2014 | Widegren | ...................... 370/312 |
| 2005/0007971 A1 * | 1/2005 | Jeong | .................... H04L 12/189 370/312 |

(Continued)

FOREIGN PATENT DOCUMENTS

| | | |
|---|---|---|
| CN | 101064622 A | 10/2007 |
| CN | 101742414 | 6/2010 |

(Continued)

OTHER PUBLICATIONS

International Search Report in PCT/CN2011/079106 mailed on Dec. 1, 2011 in 2 pages.

(Continued)

*Primary Examiner* — Hassan Kizou
*Assistant Examiner* — Deepa Belur
(74) *Attorney, Agent, or Firm* — Knobbe, Martens, Olson & Bear, LLP (57) ABSTRACT

A multimedia broadcast multicast service counting method is provided in the present invention, comprising: after receiving Multimedia Broadcast Multicast Service (MBMS) Counting Initiation information sent by a network side, a base station sending MBMS counting indication information to a User Equipment (UE) via an air interface; and the base station reporting the counting information about the MBMS to the network side according to a received MBMS counting result reported by the UE. A multimedia broadcast multicast service counting system for implementing the method is further provided in the present invention. The present invention can timely and accurately count the MBMS correspondingly, which can enable the network side to timely and accurately learn the application situation of the current MBMS and make it convenient for the network side to make relevant deployment regarding the MBMS.

13 Claims, 5 Drawing Sheets

(51) Int. Cl.
*H04L 12/24* (2006.01)
*H04W 4/06* (2009.01)
*H04W 76/00* (2009.01)
*H04L 12/26* (2006.01)
*H04L 29/08* (2006.01)
*H04L 29/06* (2006.01)
*H04N 21/61* (2011.01)

(52) U.S. Cl.
CPC ......... *H04L43/0876* (2013.01); *H04L 65/103* (2013.01); *H04L 65/1069* (2013.01); *H04L 67/22* (2013.01); *H04W 4/06* (2013.01); *H04W 76/002* (2013.01); *H04L 12/189* (2013.01); *H04N 21/6181* (2013.01)

(56) References Cited

U.S. PATENT DOCUMENTS

| | | | |
|---|---|---|---|
| 2006/0154680 A1* | 7/2006 | Kroth | H04W 74/004 455/515 |
| 2008/0045224 A1* | 2/2008 | Lu | H04W 72/005 455/446 |
| 2009/0185523 A1 | 7/2009 | Allen et al. | |
| 2011/0305183 A1* | 12/2011 | Hsu et al. | 370/312 |
| 2012/0014248 A1* | 1/2012 | Drevo | H04L 1/203 370/230 |
| 2012/0176953 A1* | 7/2012 | Chao | H04L 65/1069 370/312 |
| 2012/0307707 A1* | 12/2012 | Wang | H04W 72/005 370/312 |
| 2013/0044668 A1* | 2/2013 | Purnadi et al. | 370/312 |
| 2013/0182631 A1* | 7/2013 | Jamadagni et al. | 370/312 |
| 2013/0294320 A1* | 11/2013 | Jactat et al. | 370/312 |
| 2014/0161017 A1* | 6/2014 | Lee et al. | 370/312 |
| 2014/0219159 A1* | 8/2014 | Wang et al. | 370/312 |

FOREIGN PATENT DOCUMENTS

| | | | | |
|---|---|---|---|---|
| CN | 101742659 | | 6/2010 | |
| GB | 2485237 A | * | 5/2012 | |
| SE | WO 2013019155 A1 | * | 2/2013 | ............. H04W 4/06 |
| WO | WO 2012011854 A2 | * | 1/2012 | |

OTHER PUBLICATIONS

Chinese Office Action for Chinese Application 201010297962.X dated Nov. 4, 2014 in 4 pages.
Chinese Search Report for Chinese Application 201010297962.X dated Oct. 28, 2014 in 2 pages.
"MBMS reception Status reporting on M2 R3-102005", 3GPP TSG-RAN WG3 #69, Aug. 23-27, 2010, in 3 pages.
"MBMS reception status reporting R2-103978", 3GPP TSG-RAN WG2 Meeting #70bis, Jun. 28-Jul. 2, 2010. In 5 pages.
"MBMS reception status reporting on M2," 3GPP TSG-RAN WG3 #69 dated Aug. 23-27, 2010 in 5 pages.
"Layer 1 signaling based counting method for E-MBMS," 3GPP TSG RAN WG2 #71 dated Aug. 23-27, 2010 in 11 pages.
Japanese Office Action for Application No. 2013-529539 dated Mar. 3, 2015 in 2 pages.

* cited by examiner

MULTIMEDIA BROADCAST MULTICAST SERVICE COUNTING METHOD AND SYSTEM

CROSS-REFERENCE TO RELATED APPLICATIONS

This application is the U.S. National phase application under 35 U.S.C. §371 of International Application PCT/CN2011/079106, filed Aug. 30, 2011, which claims priority to Chinese Application 201010297962.X, filed Sep. 28, 2010.

FIELD OF THE INVENTION

The present invention relates to the Multimedia Broadcast Multicast Service (MBMS) counting technology, and in particular to an MBMS counting method and an MBMS counting system.

BACKGROUND OF THE INVENTION

With the rapid development of the Internet and the popularization of the large-screen multi-functional mobile phones, a large number of mobile data multimedia services and various high bandwidth multimedia services appear, such as video conference, television broadcast, video on demand, video ads, online education, interactive games, etc. All these mobile data multimedia services and various high bandwidth multimedia services not only meet the increasing service requirements of mobile users but also bring new service increase points for mobile operators. These mobile data multimedia services and various high bandwidth multimedia services require a plurality of users to be able to simultaneously receive the same data, and as compared to common data services, they have features such as large data amount, long duration time, and sensitive delay and so on.

In order to effectively use mobile network resources, the 3rd Generation Partnership Project (3GPP) proposes a multimedia broadcast and multicast service (MBMS), and this MBMS service is a technology of transmitting data from a data source to a plurality of targets, which achieves the share of network (comprising a core network and an access network) resources and improves the utilization rate of the network resources (especially air interface resources). The MBMS service defined by the 3GPP not only can achieve the multicast and broadcast of message class with pure text and low rate but also can achieve the broadcast and multicast of high speed multimedia services and provide various rich video, audio and multimedia services, which undoubtedly conforms to the development trend of the future mobile data and provides a better service prospect for the development of the 3rd Generation (3G) mobile communication.

Currently, the MBMS service is introduced into the Long Term Evolution (LTE) release 9 (R9) system, and it is optimized in the LTE release 10 (R10). The MBMS service is realized by the co-transmission of the control signaling (also referred to as MBMS control signaling) and user data (also referred to as the MBMS service) in the system. In this case, the control signaling will notify a receiving terminal (such as a terminal, a User Equipment (UE)), of corresponding control parameters to direct the UE to receive the MBMS service in which the UE is interested at the corresponding position, i.e. the corresponding user data. Such MBMS control signaling (control information, comprising configuration information about the MBMS service and so on) is transmitted in the LTE system via a multicast control channel (MCCH), and the MBMS service is transmitted via a multicast traffic channel (MTCH).

In particular, the MBMS control signaling (i.e. MCCH information) transmitted on the logic channel MCCH mainly contains: the multicast resource of the MBMS over a Single Frequency Network (MBSFN) area corresponding to the MCCH information, all the ongoing MBMS services (or referred to as started MBMS services, or referred to as session started MBMS services) in the MBSFN area and the configuration and property information about the ongoing MBMS services; and what is borne on the logic channel MTCH is MBMS service data, and usually the MBMS service corresponds to the MTCH, for example, MBMS service 1 corresponds to MTCH1, MBMS service 2 corresponds to MTCH2, that is, the UE reading the MBMS service expresses the same meaning as the UE reading the MTCH. In the network, the MBMS service is uniquely identified with a Temporary Mobile Group Identity (TMGI), and each MBMS service has its corresponding TMGI, which is convenient for a network side and the UE to identify.

Figure 1:
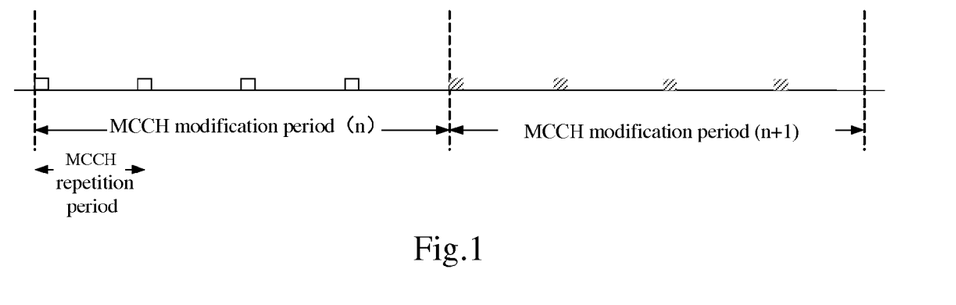
FIG. 1 is a schematic diagram of the transmission of MCCH information of an MBSFN area in the related art.

In this case, the MCCH information corresponding to the MBSFN area will be transmitted according to a certain rule (repetition period and modification period), particularly as shown in FIG. 1. FIG. 1 is a schematic diagram of sending MCCH information about an MBSFN area in the related art, and as shown in FIG. 1, the MCCH information will be transmitted once or many times repeatedly within the modification period (it is transmitted for 3 times repeatedly in FIG. 1); the interval between the repeated transmission of the MCCH information is referred to as MCCH repetition period; usually, the first transmission of the MCCH information is referred to as first transmission within the MCCH modification period, the transmission within each repetition period is referred to as repeated transmission of MCCH information, and the repeatedly transmitted MCCH information is identical to the content of the MCCH information transmitted for the first time; the MCCH modification period indicates that the contents of the transmitted MCCH information can be different within different MCCH modification periods; as shown in FIG. 1, the content of the (n+1)th MCCH modification period is different from that of the nth period (in FIG. 1, oblique line blocks and blank blocks are used to represent different contents of the MCCH information); and it needs to be noted that within the MCCH modification period, the content of the MCCH information shall not be changed and can only be transmitted repeated according to the repetition period. The content of the MCCH information is only allowed to be changed at the boundary of the beginning of the MCCH modification period, that is, the change of the MCCH information can only occur at the first transmission of the MCCH information within the MCCH modification period, which is also referred to as MCCH change time. Such regulation ensures the consistency of the transmission of the MCCH information in the MBSFN area (multi-eNB).

The configuration parameters of the MCCH repetition period and modification period are configured by the network side, and the network side sends the configuration parameters to the UE via the System Information Block 13 (SIB13) in the BCCH; the UE can learn the configuration parameters of the MCCH repetition period and modification period by reading the SIB13 in the BCCH, and the UE can read the MCCH information at the corresponding position.

Regarding in the related art that the control signaling and user data in the MBSFN area will be transmitted synchronously using the MBSFN technology in the unit of cell or eNB (the object is to enable the UE to obtain the corresponding combination gain upon reception). The MBSFN technology requires each cell in the MBSFN area to send the same data content on the same time frequency resources, which requires carrying out uniform scheduling and planning on each cell. Currently, a Multi-cell/multicast Coordination Entity (MCE) element is used to carry out uniform scheduling and planning on radio resources, which in particular can make reference to the international standards 3GPP 36.300 v910.

Figure 2:
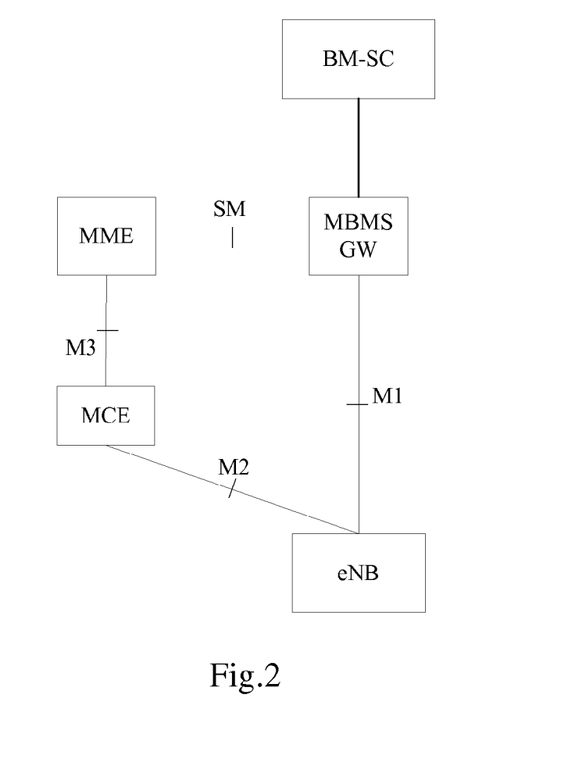
FIG. 2 is a diagram of an MBMS architecture of a LTE system in the related art.

FIG. 2 is a diagram of an MBMS architecture in a long term evolution (LTE) system in the related art. As shown in FIG. 2, in the current LTE system, network elements relevant to the MBMS have eNB, MCE, MBMS gateway, Broadcast Multicast Service Center (BM-SC), and Mobility Management Entity (MME), wherein the BM-SC is used as a network element of session start, session stop, session update, or MBMS service data provision; the MBMS GW sends the MBMS service data to the corresponding eNB via an M1 interface; the MBMS GW sends the control plane information (such as Session Start Request message, Session Stop Request message, Session Updated Request message) generated by the BM-SC to the MME; the MME is entirely used as a forwarding network element and forwards the control plane information sent by the MBMS GW to the MCE via an M3 interface; and the MCE sends the corresponding control plane information to the corresponding eNB via an M2 interface, and by means of these processing, the eNB will obtain the MBMS service data and the corresponding control plane information. Generally, the control plane information sent by the MME to the eNB via the M2 interface comprises: a session start request message, a session stop request message, a session updated request message, an MBMS scheduling information message, a reset message, an M2 setup request message, and corresponding messages sent to the MCE via the M2 interface, such as session start response message, session stop response message, session updated response message, MBMS scheduling information response message, reset acknowledge message, and M2 interface setup response message. The above signaling or process between the MCE and the eNB being borne on the M2 interface is referred to as M2 application protocol, i.e. M2AP.

It can be known from the above contents that the MBMS service will be transmitted within the entire MBSFN area. For further optimizing the transmission of the MBMS service, the industries have introduced a UE uplink feedback mechanism, and in particular, the uplink feedback mechanism is mainly applied to the network side to acquire the number of the users that are interested in/receiving each MBMS service (or the number of UEs); the network side optimizes the transmission of the MBMS service by acquiring the number of the users, for example, deactivate (or referred to as not transmit) the MBMS service with less number of users that are interested in/receiving the same, and activate (or referred to as transmit) the MBMS service with more number of the users that are interested in/receiving the same. In order to learn the number of the UEs (or if any) that are interested in/receiving a certain MBMS service, the network side can enable the UE that is interested in/receiving a certain MBMS service to carry out uplink feedback by sending a counting command to tell the UE of the current receiving state of the MBMS. The network side can apply the information acquired by way of uplink feedback (i.e. how many UE are interested in/receiving a certain MBMS service) to the activation or deactivation operation of the MBMS service, and in other words, the network side can decide whether (activate) or not (deactivate) to send the MBMS service via the air interface according to the information acquired by way of uplink feedback.

However, after the UE has reported the MBMS service which the UE is interested in or receives to the eNB via the air interface (from UE to eNB), how the network performs activation/deactivation control on the MBMS service according to the received report information, there is no feasible implementation in the related art.

SUMMARY OF THE INVENTION

In view of this, the main object of the present invention is to provide a multimedia broadcast multicast service counting method and a multimedia broadcast multicast service counting system, which can timely and accurately make statistics of the receiving UE situation of the current MBMS service.

In order to achieve the above object, the technical solution in the present invention is implemented as follows.

A multimedia broadcast multicast service counting method, comprising:

after receiving Multimedia Broadcast Multicast Service (MBMS) Counting Initiation information sent by a network side, a base station sending MBMS counting indication information to a User Equipment (UE) via an air interface; and the base station reporting counting information about the MBMS to the network side according to a received MBMS counting result reported by the UE.

Preferably, the base station receiving the MBMS Counting Initiation information from the network side comprises:

the base station receiving MBMS Counting Initiation information sent by the network side at an M2 interface, and sending an acknowledge or failure message of the request message to the network side.

Preferably, the base station receiving the MBMS Counting Initiation information from the network side comprises:

the base station receiving MBMS Counting Initiation information sent by the network side via the M2 interface, wherein the MBMS Counting Initiation information contains an MBMS list and at least one of following information: start time, duration time, interval time, and a repetition number.

Preferably, the base station receiving the MBMS Counting Initiation information from the network side comprises:

the base station receiving MBMS Counting Initiation information sent by the network side, wherein the MBMS Counting Initiation information contains an MBMS list and at least one of following information: start time, duration time, and report time.

Preferably, the MBMS Counting Initiation information contains a counting procedure regarding at least one MBMS, wherein each counting procedure comprises at least one counting report procedure.

Preferably, the MBMS list at least contains one MBMS service.

Preferably, the MBMS Counting Initiation information contains at least one counting procedure.

Preferably, the MBMS Counting Initiation information contains more than two MBMS counting procedures, and when the network side determines to terminate a pending MBMS counting procedure in the more than two MBMS counting procedures, the network side sends a stop message regarding the pending MBMS counting procedure to the base station.

Preferably, the MBMS Counting Initiation information contains more than two MBMS counting procedures, and when the network side determines to update a pending MBMS counting procedure in the more than two MBMS counting procedures, the network side sends an update message regarding the pending MBMS counting procedure to the base station.

Preferably, one MBMS counting procedure comprises: a counting procedure regarding the air interface, and the base station reporting a result of this counting.

Preferably, the counting procedures in which a number of the MBMS services is identical and content of the MBMS services is identical are the same counting procedure, and different identifiers are provided for the same counting procedure.

A multimedia broadcast multicast service counting system, comprising: a receiving unit, a first sending unit and a reporting unit, with the receiving unit, the first sending unit and the reporting unit being provided in a base station, wherein the receiving unit is configured to receive Multimedia Broadcast Multicast Service (MBMS) Counting Initiation information sent by a network side, and receive an MBMS counting result reported by a User Equipment (UE);

the first sending unit is configured to send MBMS counting indication information to the UE via an air interface; and the reporting unit is configured to report the counting information about the MBMS to the network side according to a received MBMS counting result reported by the UE.

Preferably, the base station receives the MBMS Counting Initiation information sent by the network side via an M2 interface, wherein the MBMS Counting Initiation information contains an MBMS list and at least one of following information: start time, duration time, interval time, and a repetition number.

Preferably, the base station receives the MBMS Counting Initiation information sent by the network side via an M2 interface, wherein the MBMS Counting Initiation information contains an MBMS list and at least one of following information: start time, duration time, and report time.

Preferably, the MBMS Counting Initiation information contains a counting procedure regarding at least one MBMS, wherein each counting procedure comprises at least one counting report procedure.

Preferably, the MBMS list at least comprises one MBMS service, and the MBMS Counting Initiation information contains at least one counting procedure.

Preferably, the system further comprises: a determination unit and a second sending unit provided at the network side; wherein the determination unit is configured to, when the MBMS Counting Initiation information contains more than two MBMS counting procedures, determine to terminate a pending MBMS counting procedure in the more than two MBMS counting procedures and trigger the second sending unit; and the second sending unit is configured to send a stop message regarding the pending MBMS counting procedure to the base station.

Preferably, the determination unit is further configured to, when the MBMS Counting Initiation information contains more than two MBMS counting procedures, determine to update the pending MBMS counting procedure in the more than two MBMS counting procedures, and trigger the second sending unit to send an update message regarding the pending MBMS counting procedure to the base station.

In the present invention, when the network side determines that it is required to count the number of the current receiving UE for the MBMS service, the network side will send MBMS counting initiation information to the MCE, and the MCE sends the MBMS counting initiation information to the base station via the M2 interface. After receiving the MBMS counting initiation information sent by the network side, the base station sends the MBMS counting initiation information to the UE via the air interface; the UE receiving the MBMS counting indication information will report the counting result according to the indication information, for example, when counting the number of the receiving UE of a certain MBMS service, if the UE is currently receiving this MBMS service, then the UE reports its own information; and the base station reports the counting information about the MBMS to the network side according to the received counting result of the MBMS reported by the UE. The present invention can timely and accurately count the MBMS correspondingly, which can enable the network side to timely and accurately learn the application situation of the current MBMS and make it convenient for the network side to make relevant deployment regarding the MBMS.

DETAILED DESCRIPTION OF EMBODIMENTS

The basic concept of the present invention is as follows: when a network side determines that it is required to count a number of a current receiving UE for the MBMS service, the network side will send MBMS counting initiation information to an MCE, and the MCE sends the MBMS counting initiation information to the base station via an M2 interface, and after receiving the MBMS Counting Initiation information sent by the network side, the base station sends the MBMS counting indication information to the UE via an air interface; the UE receiving the MBMS counting indication information will report a counting result according to the indication information, for example, when counting the number of the receiving UE of a certain MBMS service, if the UE is currently receiving this MBMS service, then the UE reports its own information; and the base station reports the counting information about the MBMS to the network side according to the received counting result of the MBMS reported by the UE.

In order to make the object, technical solution and advantages of the present invention more clear, the present invention will be further described in detail by way of embodiments with reference to the drawings.

First, the network side (which mainly refers to an MCE and an eNB in the present invention) triggers a procedure for initiating counting at the M2 interface, i.e. M2 MBMS Counting Initiation Procedure (the Counting Initiation Procedure at the M2 interface, which can also be referred to as MBMS counting start procedure), for configuring one or more counting procedures.

In order to save the signaling overhead at the M2 interface, the procedure of initiating counting can comprise several identical or different counting procedures, wherein each counting procedure can comprise one or more of the following information: a service list (i.e. an MBMS service list for counting, which is mainly the identification information about the MBMS), start time, duration time, interval time and a repetition number. When the repetition number of a counting procedure is greater than 1, it is equivalent to that this M2 MBMS Counting Initiation Procedure requires to perform this counting procedure for many times, and also equivalent to be configured with multiple identical counting procedures.

Within each counting procedure, 3 steps need to be included, i.e. in step 1, the eNB needs to configure the counting indication information about the above MBMS service for a cell under the control of the eNB; in step 2, the UE also has to select a MBMS service that the UE is interested in or receiving from the above service list configured by this counting procedure and report the MBMS service to the eNB; and in step 3, the eNB then counts the number of UEs that are interested in or receiving each service from the about service list and reports the number to the MCE. That is to say, one counting procedure comprises one step 1, one step 2 and one step 3.

Steps 1 and 2 correspond to a Uu MBMS Counting procedure (air interface MBMS Counting procedure). Step 3 corresponds to an M2 MBMS Counting Report procedure (the counting result report procedure of the M2 interface). That is to say, each counting procedure comprises one Uu MBMS counting procedure and one M2 MBMS Counting Report procedure.

In this case, since each counting procedure may last for a relatively long time, or a counting initiation procedure at the M2 interface may comprise multiple identical counting procedures (such as the repetition number is 5, etc.), the MCE is likely to update or cancel the counting procedure during counting. If the network side has decided whether or not to activate/deactivate one or more MBMS services according to the current counting procedure, the MCE will update or cancel the subsequent counting procedure. The present invention will be described in detail by way of the following M2 MBMS Counting Update procedure (MBMS Counting update procedure at the M2 interface) and M2 MBMS Counting Stop procedure (MBMS Counting stop procedure at the M2 interface). Of course, the MCE can also retrigger the M2 MBMS Counting Initiation procedure to update or cancel the counting of several MBMS services.

Embodiment I

Figure 3:
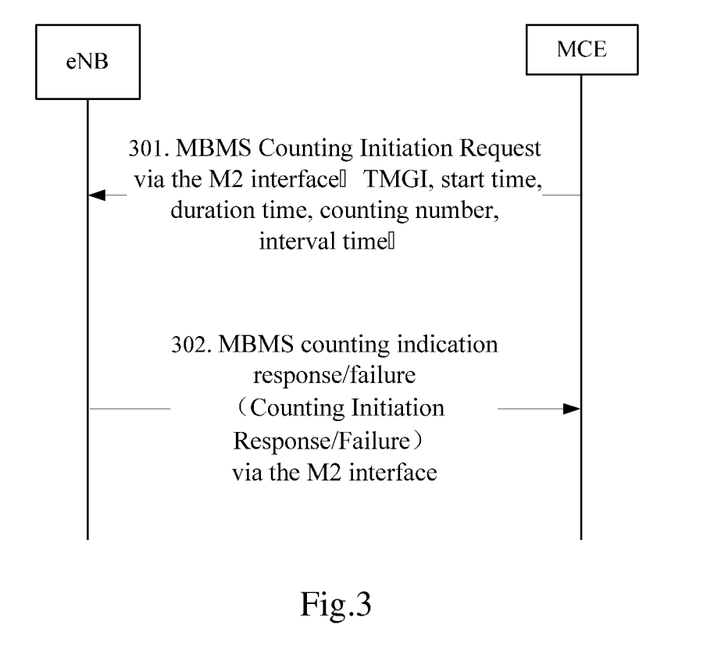
FIG. 3 is a flowchart of initiating MBMS counting over the M2 interface in the present invention.

FIG. 3 is a flowchart of initiating MBMS counting at the M2 interface in the present invention, and as shown in FIG. 3, the M2 MBMS Counting Initiation Procedure (counting initiation procedure at the M2 interface) in particular comprises the following steps.

Step 301, the MCE sends a message comprising MBMS Counting Initiation information to the eNB.

In this step, the MBMS Counting Initiation information can be provided in a newly set message, i.e. for implementing the technical solution in the present invention, a corresponding new message will be provided for initiating the MBMS counting procedure between the MCE and the base station, for example, the MBMS Counting Initiation Request message is dedicated to notify the base station to initiate the MBMS counting procedure. Of course, the above MBMS counting initiation information can also be provided in an existing message, such as MBMS Scheduling Information message. That is to say, as long as the MBMS counting initiation information is carried in a corresponding message and sent to the base station, the present invention does not limit the format and type of the message. The new message and the existing message have to be born at the M2 interface. The content of the MBMS counting initiation information in the present invention is as shown in Table 1:

TABLE 1

| | | |
|---|---|---|
| Counting procedure list | 1 . . . maxCounting Number | |
| >start time | | INTEGER (0..255) |
| > duration time | | |
| >counting number | | |
| > interval time | | |
| >Service list for counting | 1 . . . maxnoofServiceforcounting | |

In this case, the Counting procedure list (the number of counting procedures): the MBMS counting initiation information can comprise multiple different counting procedures (1, . . . , maxCounting Number). Generally, one counting procedure can be configured all the time, and at this moment, this MBMS counting initiation does not comprise an information unit Counting procedure list.

The start time can also be referred to as trigger time or MCCH update time, which indicates when the eNB configures the counting indication information about several services in one or more counting procedures into the MCCH information. Any one of the following methods can be used.

Method 1: no configuration will be performed and default configuration will be used, i.e. the MBMS Counting Initiation information does not comprise the information unit "start time", that is, after receiving a counting request from the MCE (such as MBMS Counting Initiation request message), the eNB always configures the counting indication onto the MCCH at the MCCH update time of the next MCCH modification period (or the default one).

Method 2: the MCE configures an absolute time for each counting procedure, i.e. the eNB configures the counting indication of a certain counting procedure onto the MCCH at a certain subsequent MCCH MP, and the start time of different counting procedures can be identical or different, but the start time of all the services in one counting procedure is identical.

Method 3: the MCE configures an absolute time for all the counting procedures. That is, only one start time is configured in the MBMS Counting Initiation information and used for all the counting procedures in the MBMS Counting Initiation information, or in other words, the same start time is configured for all the counting procedures in the MBMS Counting Initiation information.

The duration time indicates the duration time length for the MCE to request the eNB to count several services in one counting procedure, i.e. the time period from counting start to counting end of some service(s) by the eNB, which is indicated at the air interface (Uu interface, the interface between the eNB and the UE) as that the time length from configuring the counting indication of some service(s) on the MCCH information by the eNB to deleting the counting indication of some service(s) on the MCCH information by the eNB. Anyway, the duration time is the time length of Step 1 in one previously mentioned counting procedure (i.e. the time for configured the service list on the MCCH) but not comprise the time length of Steps 2 and 3 in the previously mentioned counting procedure.

The duration time corresponding to different counting procedures comprised in the MBMS counting initiation information (for example, counting procedures regarding different MBMSs) can be identical or different, but the duration time of all the services within one counting procedure must be identical. Any one of the following methods can be used for representation:

Method 1: no configured will be performed, and at this moment, the MBMS Counting Initiation information does not include the information unit "duration time", for example, the duration time corresponding to all the counting procedures can always last for the length of several MCCH MPs (such as it can be fixed as N MCCH MPs).

Method 2: the MCE configures a duration time for each counting procedure, for example, the duration time of one counting procedure is configured as lasting for the length of several MCCH MPs.

Method 3: the MCE configures only one duration time which is used for all the counting procedures in the MBMS Counting Initiation information for all the counting procedures, or all the services of all the counting procedures in the MBMS Counting Initiation information are configured with the same number of duration time.

The repetition number is also referred to as counting number, which indicates the number of identical counting procedures in one M2 MBMS Counting Initiation Procedure.

The interval time indicates the time interval between the end of Step 1 of the previous counting procedure and the start of Step 1 of the next counting procedure when the MCE configures a plurality of identical counting procedures for the eNB (i.e. the repetition number is plural). Any one of the following methods can be used for representing the interval time.

Method 1: an interval time is configured for each counting procedure successively.

Method 2: one interval time is configured for all the counting procedures, that is, all the counting procedures in the MBMS Counting Initiation information are configured with one interval time uniformly.

Method 3: no configured will be performed but default configuration will be used, and at this moment, the MBMS Counting Initiation information does not comprise this parameter. For example, the interval time is always 0, i.e. each counting procedure is configured and proceeds continuously, or each counting procedure is spaced with a fixed time length.

It needs to be noted that when a counting procedure has been configured for many times and the interval time is 0, the next counting procedure need not be performed until the last counting procedure is completed, instead, Step 1 of the next counting procedure can be started after Step 1 of the last counting procedure is completed, that is, when the next counting procedure starts to be performed, Step 2 or 3 of the last counting procedure need not be completed.

The maxCounting Number is the maximum number of counting procedures, wherein when only one counting procedure can be configured in one counting initiation procedure, this information unit is not required. The maxnoof-Serviceforcounting is the maximum of MBMS services in each counting procedure, that is, the service list configured on the MCCH by the eNB.

Step 302, the eNB sends a message comprising MBMS counting initiation response/failure information to the MCE.

If the eNB can implement the request message comprising the MBMS counting initiation information (such as MBMS Counting Initiation Request message), then the eNB sends an acknowledge message comprising an MBMS counting initiation response to the MCE; and if the eNB cannot implement the request message, then the eNB sends a failure message comprising MBMS counting initiation failure information to the MCE. Furthermore, the MBMS counting initiation response/failure information not only can be configured in a new response message (such as MBMS Counting Initiation Response/Failure message shown in FIG. 3) but also can be configured in the existing response message.

If the MCE fails to receive the acknowledge message of the eNB, a request message for initiating counting has to be sent to the eNB again, until the eNB replies to the acknowledge message.

Embodiment II

Figure 4:
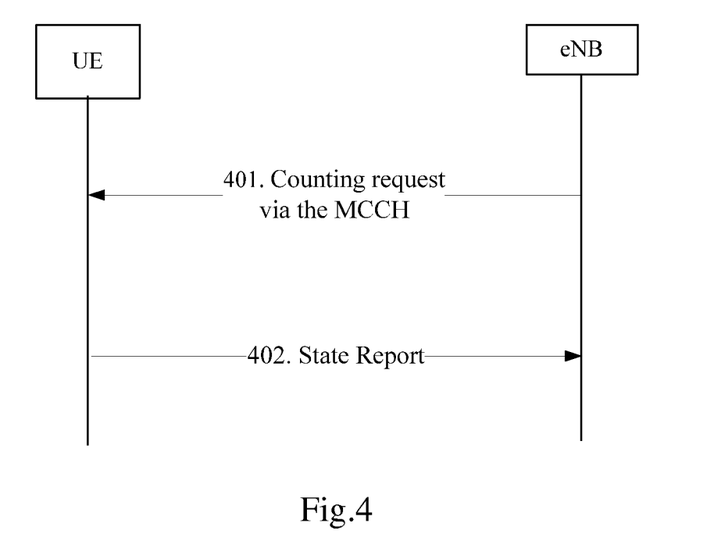
FIG. 4 is a flowchart of reporting a counting result at the Uu interface in the present invention.

FIG. 4 is a flowchart of reporting a counting result at the Uu interface in the present invention, and as shown in FIG. 4, the Uu MBMS Counting procedure (the MBMS Counting procedure of the air interface) in particular comprises the following steps:

Step 401, the eNB sends a counting indication message via the air interface (corresponding to Step 1 of the counting procedure).

After receiving the initiation counting message from the MCE and feeds back the acknowledge to the MCE (i.e. after the M2 MBMS Counting Initiation procedure is completed), the eNB sends counting indication information via the air interface (as shown in FIG. 4, this counting indication information is carried in the counting request message), so as to require the UE to feed back the MBMS service that the UE is interested in or receiving to the eNB.

The Uu MBMS Counting procedure refers to Steps 1 and 2 in the above counting procedure but not comprises Step 3.

This counting indication information is carried on a point-to-multipoint control channel, and the point-to-multipoint control channel can be a MCCH or a BCCH, and each MBMS service is represented by using a TMGI. As to each received counting procedure, the eNB configures the counting indication information about one or more MBMS services on the MCCH at its required start time, duration time, interval time, and repetition number (i.e. counting number), and the above MBMS service is sent to the eNB by the MCE by way of an MBMS counting request.

For example, according to the start time of the counting procedure configured by the MCE, the eNB configures a service list (i.e. counting indication information) on the MCCH at the MCCH change time and lasts for the time length of the "duration time".

After the duration time of one counting procedure arrives, the eNB deletes the counting indication of all the services of this counting procedure at the MCCH update time, and the UE will not read the counting indication of these services when reading the MCCH and will no longer respond to the counting.

Step 402, the UE reads the MCCH to acquire the TMGI list which requires counting indication and feeds back the MBMS service that the UE is interested in or receiving to the eNB (corresponding to Step 2 in the counting procedure).

In particular, during one counting procedure, the "duration time" could always appear in the service list configured on the MCCH, and once reading the MCCH and acquiring the service list, the UE could feed back the MBMS service that the UE is interested in or receiving to the eNB.

Embodiment III

Figure 5:
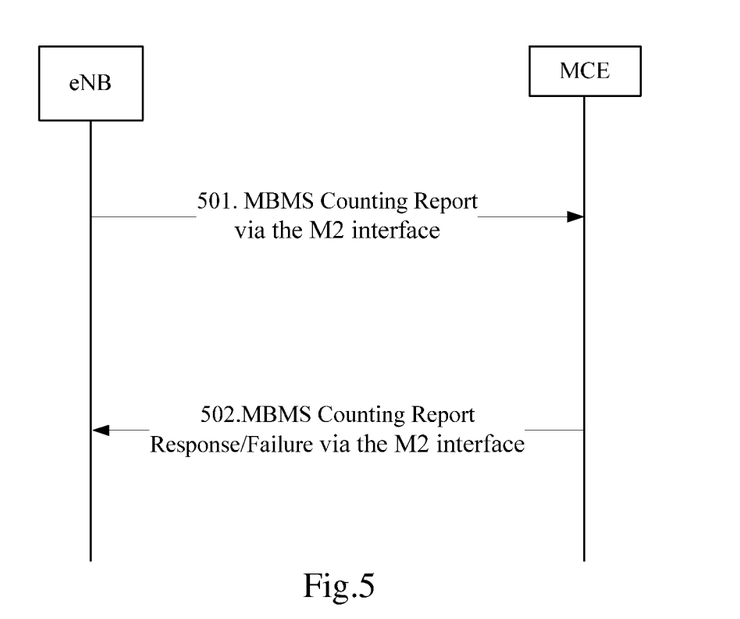
FIG. 5 is a flowchart of reporting a counting result at the M2 interface in the present invention.

FIG. 5 is a flowchart of reporting a counting result of the M2 interface in the present invention, and as shown in FIG. 5, the M2 MBMS Counting Report procedure (the counting result report procedure of the M2 interface, corresponding to Step 3 in the counting procedure) in particular comprises the following steps.

Step 501, the eNB sends a message comprising MBMS counting report information (MBMS counting report message) to the MCE.

After completing the Uu MBMS Counting procedure, the eNB reports the counting result of the service to the MCE. If receiving the counting result correctly, the MCE sends an acknowledge message to the eNB, otherwise, the MCE sends a failure message.

The MBMS counting report information comprises counting results of all the services in one counting procedure, wherein the information not only can be carried in a new message but also can be carried in an existing message. The counting results can be one of the following methods.

Method 1: the number of UEs that are interested in or receiving (for example, the number of users of Service 1, the number of users of Service 2, . . . , and the number of users of Service N).

Method 2: the maximum value of the number of UEs is limited on the basis of the above Method 1, i.e. when the number of users is greater than the maximum value, the reporting will be carried out by using the maximum value (the advantage of this method is that it is convenient to make an agreement on the report overhead, and when the number of UEs reaches the maximum value, to report more users will have no much meaning).

Method 3: the number of UEs that are interested in or receiving is classified substantially, for example, there are few users, the number of users is normal, there are more users, and although the counting result is relatively rough, it is simple and there is less reporting overhead.

Step 502, the MCE sends a message comprising MBMS counting report response/failure information (MBMS Counting Report Response/Failure message) to the eNB.

The MBMS counting report response/failure information not only can be carried in a new message but also can be carried in an existing message. In particular, if the MCE receives the message comprising MBMS counting report information correctly, then the MCE feeds back an acknowledge message containing MBMS counting report response information to the eNB, otherwise the MCE feeds back a failure message containing MBMS counting report failure.

Embodiment IV

Figure 6:
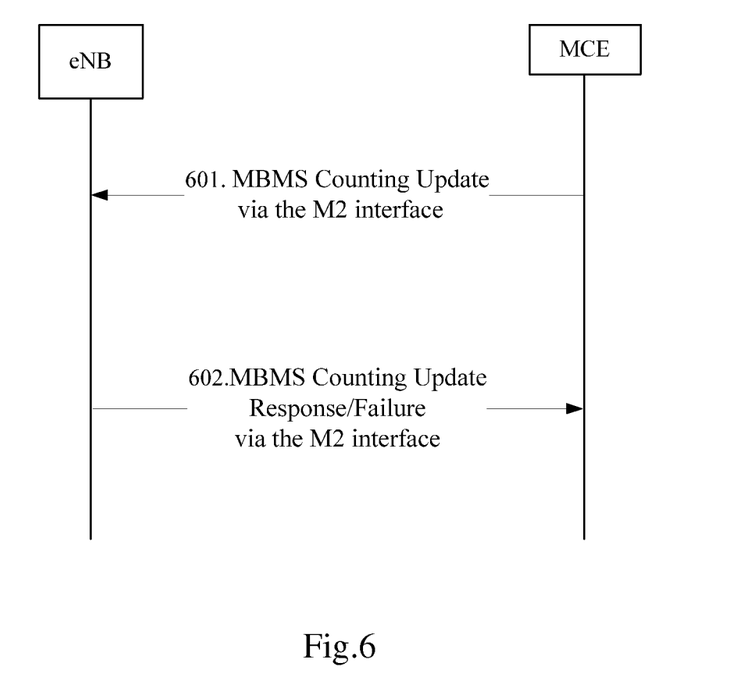
FIG. 6 is a flowchart of updating a counting result at the M2 interface in the present invention.

FIG. 6 is a flowchart of updating a counting result at the M2 interface in the present invention, and as shown in FIG. 6, the M2 MBMS Counting Update procedure (counting update procedure of the M2 interface) can update some counting procedure(s) and can also add or delete the service list, start time, duration time, repetition number, interval time, etc. in several counting procedures; and in addition, to add or delete several counting procedures can be realized by retriggering the M2 MBMS Counting Initiation Procedure or the M2 MBMS counting stop procedure.

In particular, the following steps are comprised.

Step 601, the MCE sends a relevant message comprising MBMS counting update information to the eNB.

This counting update information not only can be carried in a new message but also can be carried in an existing message (such as MBMS counting update message). In this counting update information, the MCE may have to update some counting procedure(s), i.e. to add or delete several counting procedures or modify the configuration information about several counting procedures, such as the service list, start time, duration time, repetition number, interval time, etc. in some counting procedure(s).

For example, as to a certain counting procedure, the service therein can be added or reduced, or the time parameters and so on therein can be modified.

Step 602, the eNB sends a relevant message comprising MBMS counting update response information to the MCE.

If the eNB receives a counting update request correctly and performs the same, the eNB sends a counting update acknowledge to the MCE; and if the eNB cannot receive the counting update request correctly, the eNB sends an MBMS counting update failure to the MCE. Likewise, this counting update acknowledge/failure information not only can be configured in a new response message as an information block but can also be configured in an existing response message. In particular, the counting update information request is configured in a new message such as the MBMS counting update message or the MBMS counting update response/acknowledge message, and an MBMS counting update Failure message will be sent to the MCE.

This procedure is very similar to the M2 MBMS counting initiation procedure in Embodiment I. That is, the MCE can reconfigure the counting procedure by retriggering the M2 MBMS counting initiation procedure.

Embodiment V

Figure 7:
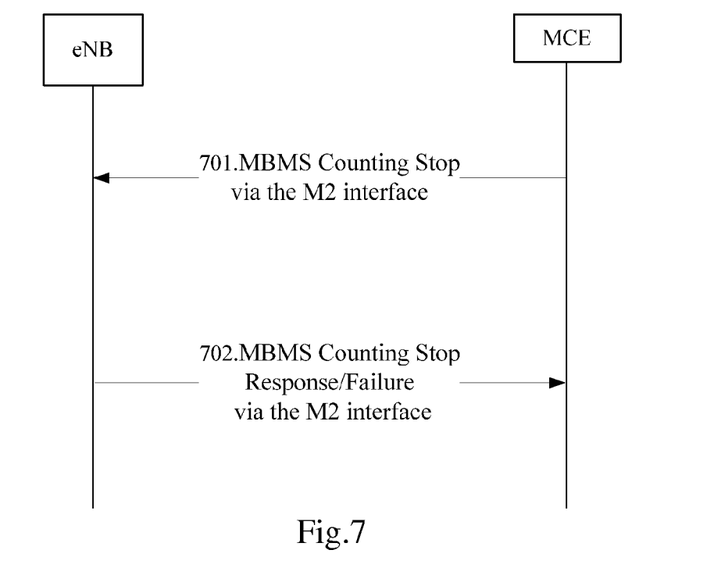
FIG. 7 is a flowchart of stopping a counting at the M2 interface in the present invention.

In a counting initiation procedure, the MCE can also cancel (i.e. stop) several counting procedures. Once some counting procedure(s) is/are deleted, all the services in this or these counting procedures will no long need counting. FIG. 7 is a flowchart of stopping a counting at the M2 interface in the present invention, and as shown in FIG. 7, the M2 MBMS counting stop procedure (the counting stop procedure at the M2 interface) in particular comprises the following steps.

Step 701, the MCE sends a message comprising M2 MBMS counting stop information to the eNB.

This information for ending one or more counting procedures not only can be carried in a new message but also can be carried in an existing message. The MCE can send a counting stop command to the eNB during one counting procedure or during a same counting procedure, i.e. any time during one or more identical counting procedures.

Step 702, the eNB sends a message comprising M2 MBMS counting stop response (acknowledge)/failure information to the MCE.

The MBMS counting report response (acknowledge)/ failure information not only can be carried in a new message but also can be carried in an existing message. If the eNB can receive the same correctly, then the eNB replies with an acknowledge message to the MCE, otherwise, the eNB replies with a failure message. At this moment, the eNB deletes the counting indication of the above service on the MCCH at the beginning of the MCCH MP and no longer counts the counting result of the above service, neither sends the counting result to the MCE.

Embodiment VI

Hereinafter, the essence of the technical solution in the present invention will be further described by taking a completed counting procedure as an example, and this counting procedure comprises that the MCE initiates counting, then the eNB configures the service list of the counting on the MCCH, and finally the counting procedure is completed.

In particular, the following steps are comprised.

Step a, the MCE sends an MBMS counting initiation message to the eNB.

when the network side needs to count how many UEs are interested in or receiving one or more services (counting how many UEs are receiving those not yet beginning services, and counting how many UEs are interested in those not yet beginning services), the MCE sends a counting initiation message to the eNB. The message can comprise one or more counting procedures, and each counting procedure comprises: a service list, start time, duration time, interval time, a repetition number, etc.

Step b, the eNB sends an MBMS counting initiation response message to the MCE.

If the eNB can receive the counting initiation message correctly, then the eNB feeds back a response message, otherwise, the eNB feeds back a failure message.

When the eNB feeds back a failure message to the MCE, the MCE has to resend the MBMS counting initiation message to the eNB until the eNB can receive the same correctly and feeds back a success message.

Step c, the eNB starts to configure the service list which needs counting on the MCCH for all the cells under the control of the eNB.

At the specific start time, the eNB configures the service list which needs counting on the MCCH and lasts for the duration time, and each counting procedure has an identifier (such as serial number). The UE can feed back the service that the UE is interested in or receiving during the present counting procedure according to this identifier.

Step d, the eNB sends an MBMS counting report message to the MCE.

After a counting procedure is completed, the eNB reports the counting result of this counting procedure to the MCE.

Step e, the MCE sends an MBMS counting report acknowledge message to the eNB.

If the MCE can receive the counting report message correctly, then it feeds back a response message, otherwise, the MCE feeds back a failure message.

When the eNB feeds back a failure message to the MCE, the eNB has to resend the counting report message to the MCE until the MCE can receive the same correctly and feeds back a success message.

When the MCE configures for a counting procedure many times by way of the MBMS counting initiation procedure, and as to all the services of this counting procedure, if the MCE decides that the subsequent counting procedures will no longer be needed (i.e. it no longer requires to count all the services during this counting procedure, of course, the service list during this counting procedure can have merely one service) according to this counting report (it can also be other factors), then the MCE sends an MBMS counting stop message to the eNB, wherein the MBMS counting stop message is used for deleting one or more counting procedures. The eNB sends an MBMS counting stop acknowledge message to the MCE and no longer configures this counting procedure on the MCCH, i.e. the MCCH no longer comprises the counting indication of all the services during this counting procedure.

Alternatively, as to several service during this counting procedure, if the MCE decides that the subsequent services will no longer be needed according to the present counting report (it can also be other factors), then the MCE sends an MBMS counting update message to the eNB, wherein the message can delete several services during one counting procedure (which is equivalent to adjusting the service list of this counting procedure), and also can reconfigure other configuration parameters during one counting procedure (such as start time, duration time, interval time, a repetition number, etc.).

The eNB sends an MBMS counting update acknowledge message to the MCE, and eNB replies with an acknowledge message to the MCE and no longer configures several services during this counting procedure on the MCCH, i.e. the MCCH will no longer comprise the counting indication of part of the services during this counting procedure.

Embodiment VII

Figure 8:
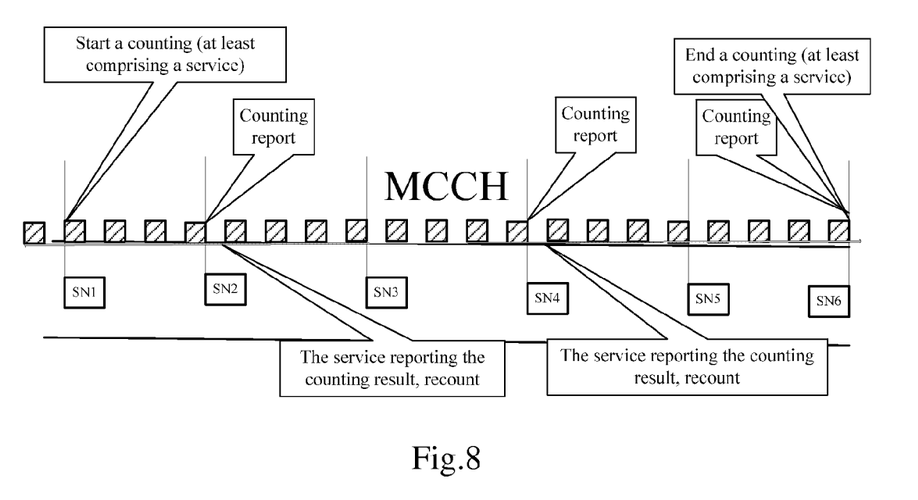
FIG. 8 is a schematic diagram of transmitting MBMS Counting Initiation information in the present invention.

FIG. 8 is a schematic diagram of sending MBMS Counting Initiation information in the present invention, and as shown in FIG. 8, the MBMS Counting Initiation information in this example only comprises one counting procedure, and each counting procedure further comprises several counting report procedures. This counting procedure at least comprises the counting indication of several services, each counting report procedure also comprises the counting reports of several services, and these services are all or part of the services during the counting procedure.

The counting initiation procedure of the MBMS service at the M2 interface (M2 MBMS counting initiation procedure) in particular comprises the following steps.

Step A, the MCE sends an MBMS counting start request message to the eNB.

The MCE sends the MBMS counting start request message to all the eNBs in the MBSFN area thereof, and the message comprises: one or more MBMS services which need counting, and as to the above services, one or more of the following information can also be comprised (or not be comprised): start time, duration time, report time of the counting.

When this message comprises the report time, the following step that "the eNB sends an MBMS counting report request message to the MCE" may not be performed, i.e. the MCE no longer needs to configure the result of counting report for the eNB by way of a request message.

The configuration manner of the report time can be {Service 1, Report Time 1; Service 2, Report Time 2, . . . , Service n, Report time n,}, and one report time can be configured for these services uniformly, i.e. {Report Time; Service 1, Service 2, . . . , Service n}.

A plurality of report times can be configured for each service, such as {Service 1, Report Time 1, Report Time 2, . . . , Report Time k}, which indicates that the eNB reports the counting result to the MCE at these report times.

The eNB sends an MBMS counting report response message to the MCE according to the report time of each service or the uniform report time of all the services.

Step B, the eNB sends an MBMS counting start response message to the MCE.

The eNB receives the MBMS counting start request message and can configure the counting indication and relevant information about the above service at the air interface, then the eNB feeds back an MBMS counting start response message to the MCE.

Step C, the eNB configures the counting indication of the above service on the MCCH.

Step C can also be performed prior to Step B or performed simultaneously.

In this step, the eNB configures the above service list on the MCCH at the MCCH update time according to the MCCH modification period indicated by the counting start time configured in Step 1. If the counting start time is not configured in Step A, then the above service list could be configured onto the MCCH at the MCCH update time of the next MCCH modification period.

In this step, the eNB configures the list of the above service on the MCCH all the time according to the counting duration time configured in Step A. If the counting duration time is not configured in Step A, the list of the above service will be configured on the MCCH all the time.

Step D, the UE reads the MCCH message and reports the MBMS service that the UE is interested in or receiving to the eNB.

This step is after Step C. The UE in the cell under the control of the eNB reads the MCCH message, and reports the MBMS service that the UE is interested in or receiving to the eNB according to the service list that needs counting configured in the MCCH message.

Each service for counting in the MCCH message can also comprise a counting identifier (such as serial number or sequent number SN) for distinguishing different Step D.

For example, a certain UE reads the MCCH, the service list on this MCCH for counting is represented as: {Service 1, SN1}, {Service 2, SN2}, . . . , {Service n, SNn}, and as to the counting identifier SN of each service, the UE only reports the counting result once, which can prevent the eNB counts the counting result of one UE repeatedly and can also reduce the uplink signaling overhead caused by many reports of the UE.

The counting report procedure of the MBMS service at the M2 interface (M2 MBMS counting report procedure) in particular comprises the following steps.

Step A1, the eNB sends an MBMS counting report request message to the MCE.

If the MBMS counting start request message to the MCE by the eNB comprises the "report time", then this step is no longer needed.

The MCE sends an MBMS counting report request message to all the eNBs in the MBSFN area thereof, wherein the message can comprise (or not comprise) one or more MBMS services which need to report the counting result. These MBMS services which report counting can be all or part of those configured during the MBMS service counting initiation procedure, and can also comprise (or not comprise) the time when reporting the counting result (report time) (that is, to report the counting result after which MCCH modification period); and can also comprise (or not comprise) the updated counting identifier (SN) of these services that have reported the result.

If this message does not comprise an MBMS service list for reporting the counting result, then this message indicates that the MCE requests the eNB to report all the services configured during the "MBMS service counting initiation procedure".

If this message does not comprise the "report time", i.e. default report time is used, then this message indicates that after receiving this request message, the eNB counts the counting result of the service in this message at the MCCH update time of the next MCCH modification period and report the same to the MCE.

If this message comprises the "updated counting identifier" of each service, then this message indicates that the UE need not report the counting result to the eNB again. That is, the UE report the counting result to the eNB according to the counting identifier of a certain service on the MCCH, and the counting identifier of a service is used to report the counting result of this service to the eNB once.

Step B1, the eNB sends an MBMS counting report response message to the MCE.

The eNB counts the counting result of the service in the "MBMS counting report request message" according to the "report time" specified in the "MBMS counting report request message" or according to the report time configured in the "the MBMS counting start request message sent by the eNB to the MCE", i.e. the counting result is reported to the MCE at the specific report time.

The counting identifiers (SN) of these services which have reported the results may not be updated, and in addition, the counting identifiers (SN) of these services which have reported the results can be simultaneously updated as new counting identifiers (such as SN+1). The time when updating the counting identifiers of several services on the MCCH must occur at the MCCH update time. That is, at the report time specified in Step 1, the eNB on one hand reports the counting results of these services and at the same time updates the counting identifiers of these services at the MCCH update time, so that after reading the MCCH, the UE can obtain the new counting identifiers of these services and has to report the service that the UE is interested in and/or receiving again, that is, it is a new counting for the UE.

For example, the counting service list of the MCCH read by the UE is {Service 1, SN1}, {Service 2, SN2}, {Service 3, SN3}, . . . , {Service n, SNn}, and the UE reports the service that the UE is interested in and/or receiving once; and after the eNB has reported the counting result to the MCE once, the eNB updates the content of the MCCH at the MCCH modification period, wherein the content comprises the updated counting identifier: {Service 1, SN1+1}, {Service 2, SN2+1}, {Service 3, SN3+1}, . . . , {Service n, SNn+1}, and at this moment after reading the MCCH, the UE finds that the counting identifiers of these services have been updated, then the UE has to report the service that it is interested in and/or receiving once again.

After the MCE can decide to activate/deactivate the counting of one or more services according to the above counting report procedure, the MCE can delete the counting requests of these services toward the eNB.

The counting stop procedure of the MBMS service at the M2 interface (M2 MBMS counting stop procedure) in particular comprises the following steps.

Step A2, the MCE sends an MBMS counting stop message to the eNB.

This message comprises several services in the service list originally configured on the MCCH for counting for indicating that these services no long need the UE to report the counting result.

Step B2, the eNB sends an MBMS counting stop acknowledge message to the MCE.

After receiving the request message in Step A2, the eNB sends an acknowledge message to the MCE.

Step C3, the eNB deletes the counting indication and relevant information about several services on the MCCH.

When the "counting initiation procedure of the MBMS service at the M2 interface" comprises the duration time of several services, Steps A2 and B2 are not required for these services, i.e. after the duration of this/these services arrives, Step C3 will be performed directly.

According to several service lists configured by the "MBMS counting stop message" or when the "counting initiation procedure of the MBMS service at the M2 interface" comprises the duration time of several services and the duration time arrives, the eNB modifies the content of the MCCH at the MCCH update time, that is, the eNB deletes the counting indication and relevant information about these services.

This step can be at the same time with Step B2 or prior to Step B2 but has to be after Step A2, that is, this step can be performed once the eNB receives a counting stop message.

For example, after "the MCE sends an MBMS counting start request message to the eNB", the services for counting configured by the eNB on the MCCH are: {service 1, relevant information 1}, {service 2, relevant information 2}, {service 3, relevant information 3}, . . . , {service n, relevant information n}, and these relevant information can be: start time, duration time, report time, etc.

When "the MCE sends an MBMS counting stop message to the eNB" and Service 2 is included (which indicates that Service 2 no longer needs to be reported by the UE, i.e. the eNB no longer needs to count the counting result of Service 2), the services for counting configured by the eNB on the MCCH are: {service 1, relevant information 1}, {service 3, relevant information 3}, . . . , {service n, relevant information n}, the counting result reported by the UE after reading the MCCH no longer comprises Service 2.

The counting update procedure of the MBMS service at the M2 interface (M2 MBMS counting update procedure) is similar to the counting initiation procedure of the MBMS service at the M2 interface, that is, the counting indication and relevant information about each service can be configured by way of the counting initiation procedure of the MBMS service at the M2 interface (the relevant information comprises: start time, duration time, report time, etc.).

Figure 9:
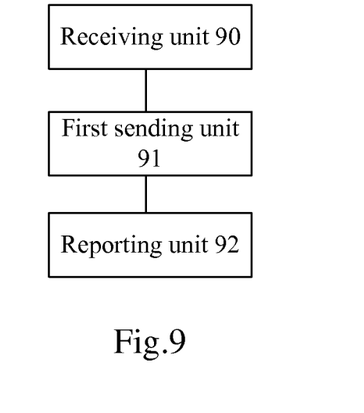
FIG. 9 is a schematic structural diagram of a composition of a multimedia broadcast multicast service counting system in the present invention.

FIG. 9 is a schematic structural diagram of a composition of a multimedia broadcast multicast service counting system in the present invention, and as shown in FIG. 9, the multimedia broadcast multicast service counting system in the present invention comprises a receiving unit 90, a first sending unit 91 and a reporting unit 92, wherein the receiving unit 90, the first sending unit 91 and the reporting unit 92 are provided in a base station.

The receiving unit 90 is configured to receive MBMS counting indication information sent by a network side, and receive an MBMS counting result reported by a UE.

The sending unit 91 is configured to send the MBMS counting indication information to the UE via an air interface.

The reporting unit 92 is configured to report counting information about the MBMS to the network side according to the received MBMS counting result reported by the UE.

The network side sends MBMS counting initiation information to the base station via an M2 interface, wherein the MBMS counting initiation information contains an MBMS list and at least one of the following information: start time, duration time, interval time, and a number of repetitions.

The network side sends MBMS counting initiation information to the base station via the M2 interface, wherein the MBMS counting initiation information contains an MBMS list and at least one of the following information: start time, duration time, and report time.

The MBMS Counting Initiation information contains a counting procedure regarding at least one MBMS, wherein each counting procedure comprises at least one counting report procedure.

The MBMS Counting Initiation information contains a counting procedure regarding at least one MBMS, wherein each counting procedure comprises at least one counting report procedure.

The MBMS list at least comprises an MBMS service, and the MBMS counting indication information contains at least one counting procedure.

On the basis of the system shown in FIG. 9, the multimedia broadcast multicast service counting system in the present invention further comprises a determination unit (not shown) and a second sending unit (not shown) provided at the network side, wherein the determination unit is configured to, when the MBMS counting indication information contains more than two MBMS counting processes, determine to terminate a pending MBMS counting process in more than two MBMS counting processes and trigger the second sending unit; and the second sending unit is configured to send a stop message regarding the pending MBMS counting process to the base station.

The above determination unit is further configured to, when the MBMS counting indication information contains more than two MBMS counting processes, determine to update the pending MBMS counting process in the more than two MBMS counting processes, and trigger the second sending unit to send an update message regarding the pending MBMS counting process to the base station.

It would be appreciated by those skilled in the art that the multimedia broadcast multicast service counting system shown in FIG. 9 in the present invention is designed for realizing the multimedia broadcast multicast service counting method mentioned above, and the implementation functions of the above various processing units can be understood by reference to the relevant description of the above Embodiment III. The functions of various processing units in the figure can be implemented by the programs running on the processor, and can also be implemented by way of a particular logic circuit.

What are described above are merely preferred embodiments of the present invention, not for limiting the scope of protection of the present invention.

What is claimed is:

1. A multimedia broadcast multicast service counting method, comprising:

each of a plurality of eNBs in a Multimedia Broadcast Multicast Service (MBMS) over a Single Frequency Network (MBSFN) area receiving an MBMS Counting Initiation information sent by a network side at an M2 interface, wherein the MBMS Counting Initiation information comprises an MBMS list and start time, wherein the MBMS list comprises identification information for the MBMS and the start time indicates when an eNB configures the MBMS list;

after receiving the MBMS Counting Initiation information sent by the network side, each of the plurality of eNBs configuring the MBMS list during a Multicast Control Channel (MCCH) update time according to an MCCH modification period indicated by the start time, sending an acknowledge or failure message of a request message to the network side, and sending the MBMS counting indication information to User Equipments (UEs) via an air interface; and each of the plurality of eNBs reporting counting information about the MBMS to the network side according to a received MBMS counting result reported by the UEs;

wherein when the network side fails to receive the acknowledge message of an eNB from the plurality of eNBs, the request message for initiating counting is sent to the eNB again until the eNB replies to the acknowledge message.

2. The method according to claim 1, wherein the MBMS Counting Initiation information contains a counting procedure regarding at least one MBMS, wherein each counting procedure comprises at least one counting report procedure.

3. The method according to claim 1, wherein the MBMS list contains at least one MBMS service.

4. The method according to claim 1, wherein the MBMS Counting Initiation information contains at least one counting procedure.

5. The method according to claim 4, wherein the MBMS Counting Initiation information contains more than two MBMS counting procedures, and when the network side determines to terminate a pending MBMS counting procedure in the more than two MBMS counting procedures, the network side sends a stop message regarding the pending MBMS counting procedure to each of the plurality of eNBs; or the MBMS Counting Initiation information contains more than two MBMS counting procedures, and when the network side determines to update a pending MBMS counting procedure in the more than two MBMS counting procedures, the network side sends an update message regarding the pending MBMS counting procedure to each of the plurality of eNBs.

6. The method according to claim 4, wherein the MBMS Counting Initiation information contains more than two MBMS counting procedures, and when the network side determines to update a pending MBMS counting procedure in the more than two MBMS counting procedures, the network side sends an update message regarding the pending MBMS counting procedure to the eNB.

7. The method according to claim 4, wherein one MBMS counting procedure comprises: a counting procedure regarding the air interface, and each of the plurality of eNBs reporting a result of this counting.

8. The method according to claim 4, wherein the counting procedures in which a number of the MBMS services is identical and content of the MBMS services is identical are the same counting procedure, and different identifiers are provided for the same counting procedure.

9. A multimedia broadcast multicast service counting system, comprising a hardware processor comprising logic circuitry configured to execute a receiving unit, a first sending unit and a reporting unit, wherein:

the receiving unit is configured to receive Multimedia Broadcast Multicast Service (MBMS) Counting Initiation information sent by a network side at an M2 interface, and receive an MBMS counting result reported by User Equipments (UEs), wherein the MBMS Counting Initiation information comprises an MBMS list and start time, wherein the MBMS list comprises identification information for the MBMS and the start time indicates when an eNB configures the MBMS list; the first sending unit is configured to configure the MBMS list and send the configured MBMS list during a Multicast Control Channel (MCCH) update time according to an MCCH modification period indicated by the start time, and send the MBMS counting indication information to the UEs via an air interface; and the reporting unit is configured to report the counting information about the MBMS to the network side according to a received MBMS counting result reported by the UEs, wherein when the receiving unit receives MBMS Counting Initiation information sent by a network side at the M2 interface, the MBMS system is further configured to send an acknowledge or failure message of a request message to the network side;

wherein when the network side fails to receive the acknowledge message of an eNB from the plurality of eNBs, the request message for initiating counting is sent to the eNB again until the eNB replies to the acknowledge message.

10. The system according to claim 9, wherein the MBMS Counting Initiation information contains a counting procedure regarding at least one MBMS, wherein each counting procedure comprises at least one counting report procedure.

11. The system according to claim 9, wherein the MBMS list at least comprises one MBMS service, and the MBMS Counting Initiation information contains at least one counting procedure.

12. The system according to claim 11, wherein the logic circuitry of the hardware processor is further configured to implement a determination unit and a second sending unit; wherein:

the determination unit is configured to, when the MBMS Counting Initiation information contains more than two MBMS counting procedures, determine to terminate a pending MBMS counting procedure in the more than two MBMS counting procedures and trigger the second sending unit; and the second sending unit is configured to send a stop message regarding the pending MBMS counting procedure to each of a plurality of eNBs; or the determination unit is further configured to, when the MBMS Counting Initiation information contains more than two MBMS counting procedures, determine to update the pending MBMS counting procedure in the more than two MBMS counting procedures, and trigger the second sending unit to send an update message regarding the pending MBMS counting procedure to each of the plurality of eNBs.

13. The system according to claim 12, wherein the determination unit is further configured to, when the MBMS Counting Initiation information contains more than two MBMS counting procedures, determine to update the pending MBMS counting procedure in the more than two MBMS counting procedures, and trigger the second sending unit to send an update message regarding the pending MBMS counting procedure to each of the plurality of eNBs.

* * * * *